United States Patent
Chen et al.

(10) Patent No.: US 11,041,767 B2
(45) Date of Patent: Jun. 22, 2021

(54) SENSING DEVICE OF PRESSURE AND TEMPERATURE IN MOLD

(71) Applicant: METAL INDUSTRIES RESEARCH&DEVELOPMENT CENTRE, Kaohsiung (TW)

(72) Inventors: Shuo-Ching Chen, Kaohsiung (TW); Hsiu-An Tsai, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 105 days.

(21) Appl. No.: 16/654,072

(22) Filed: Oct. 16, 2019

(65) Prior Publication Data
US 2020/0173871 A1  Jun. 4, 2020

(30) Foreign Application Priority Data
Nov. 30, 2018  (TW) .................. 107142887

(51) Int. Cl.
| | | |
|---|---|---|
| *G01L 1/22* | (2006.01) | |
| *G01K 13/00* | (2021.01) | |
| *G01K 13/02* | (2021.01) | |
| *G01K 1/14* | (2021.01) | |
| *G01L 9/00* | (2006.01) | |
| *G01L 19/00* | (2006.01) | |
| *G01L 5/00* | (2006.01) | |
| *G01L 23/18* | (2006.01) | |
| *G01L 23/22* | (2006.01) | |

(52) U.S. Cl.
CPC ............ *G01L 1/2243* (2013.01); *G01K 13/00* (2013.01); *G01K 13/02* (2013.01); *G01K 1/14* (2013.01); *G01L 5/0061* (2013.01); *G01L 9/006* (2013.01); *G01L 9/0051* (2013.01); *G01L 19/0092* (2013.01); *G01L 23/18* (2013.01); *G01L 23/22* (2013.01)

(58) Field of Classification Search
CPC .......... G01K 13/02; G01K 13/00; G01K 1/14; G01K 1/2243; G01L 19/0092; G01L 23/18; G01L 23/22; G01L 9/0051; G01L 9/006; G01L 5/0061
See application file for complete search history.

(56) References Cited

U.S. PATENT DOCUMENTS 6,062,087 A * 5/2000 Vovan ..................... G01K 1/12
                                                          374/143
6,345,974 B1   2/2002 Kawasaki et al.

* cited by examiner

*Primary Examiner* — Jonathan M Dunlap
(74) *Attorney, Agent, or Firm* — WPAT, PC

(57) ABSTRACT

A sensing device of pressure and temperature in a mold comprises: a housing communicating with a mold cavity, and including a channel and an accommodating space; a base on a bottom surface of the housing, and including a mesa on a top; a strut in the accommodating space, and a front end thereof extended into the channel and exposed to the mold cavity; a strain structure between the mesa and a back end of the strut, and located on the mesa; a strain gage on the strain structure to measure a deformation amount of the strain structure the mold cavity and transforming the deformation amount into deformation amount information; a temperature-sensing element in the strut to measure a temperature of the strut, and transforming the temperature into strut temperature information; and a processing unit to obtain the deformation amount information and the strut temperature information.

19 Claims, 6 Drawing Sheets

SENSING DEVICE OF PRESSURE AND TEMPERATURE IN MOLD

CROSS-REFERENCE TO RELATED APPLICATION

This application claims the benefit of Taiwan Patent Application No. 107142887, filed on Nov. 30, 2018, which is hereby incorporated by reference for all purposes as if fully set forth herein.

BACKGROUND

Technical Field

The present invention is a sensing device of pressure and temperature in a mold, and in particular, a sensing device for real-time measurement of pressure and temperature changes of a mold in a same position in a mold cavity.

Related Art

Injection molding is a rapid molding machining method without cutting, for example, a process such as ejection molding and pressure casting, and has features such as high production efficiency, good economic indicators, high dimensional accuracy and good interchangeability. Therefore, injection molding is widely applied to and rapidly developed in large-scale industries. Pressure casting is a main molding method of light metals such as aluminum, magnesium and zinc, and is suitable for producing large complex thin-walled housing parts. Die castings have become an important component of products in fields such as automobiles, sports equipment, electronics, and aerospace, where the automotive industry is a main field of applications of pressure casting technologies, accounting for more than 70%. With rapid development of fields such as automobiles, motorcycles, internal combustion engines, electronic communications, instrumentations, household appliances, and hardware, functions and application fields of the die castings constantly expand, thereby promoting rapid development of pressure casting technologies.

However, currently, designs and production schemes of an injection molding product are both based on actual production experience, and are performed in a manner combining CAD and CAE. Therefore, a simulated in-mold pressure curve is quite different from an actual in-mold pressure curve, as shown in FIG. 1, while problems in an actual production process are mostly analyzed and measures are taken based on actual experience. Currently, an injection molding industry faces at least the following problems: 1. Assembly quality and aging conditions of process equipment are different, and process parameter correction efficiency is low; 2. Finished product quality cannot be monitored in real time, and can be only learned through post-production sampling inspection; 3. Costs of small batch production are excessively high, and inventory optimization cannot be achieved.

The American patent U.S. Pat. No. 6,345,974B1 discloses an ejector pin with pressure sensor, where an injection pin of the ejector pin includes a pin of an extruded injection workpiece and a sleeve smoothly sleeving the pin. An end of the pin faces a mold cavity by guiding an opening of parts of the end. A cavity is defined by a step part of a lower end of the sleeve. A U-shaped strain forming part located in a base part of the pin is disposed in the cavity. A strain sensor is attached on a lower surface of a crossbeam of the strain forming part. When pressure of injected resin is applied to the end of the pin, a downward load applied to the pin bends the crossbeam downwards. An installation position of only a sensing element configured in this structure is outside a mold, belonging to an indirect measurement mode, and a position in which the pin props the crossbeam needs to be a center of the crossbeam. Otherwise if the propping position is slightly off-center, a distortion rate of deformation data will be greatly increased.

SUMMARY

A purpose of the present invention is to provide a sensing device for directly measuring an in-mold pressure and an in-mold temperature in an injection molding process in a mold, and the sensing device is applied to a signal output line reserving a strain gage and a temperature-sensing element in a strain structure of a non-pressure transfer path, so that both the strain gage and the temperature-sensing element can be installed in the sensing device.

To achieve the foregoing purpose, the present invention provides a sensing device of pressure and temperature in a mold, and a structure of the sensing device includes: a housing, disposed in the mold and in communication with a mold cavity of the mold through a top surface, where the housing includes a channel disposed on the top surface and an accommodating space in communication with the channel, and a bottom surface of the housing includes an open end in communication with the accommodating space; a base, disposed in the open end of the bottom surface of the housing to close the accommodating space, and including a mesa on a top; a strut, disposed in the accommodating space, where a front end of the strut is extended into the channel and exposed to the mold cavity, so that after the front end transfers pressure of the mold cavity, the strut performs an axial displacement in the channel; a strain structure, disposed between the mesa and a back end of the strut and located on the mesa, and configured to transform the pressure transferred by the displacement of the strut into a deformation amount of the strain structure; at least one strain gage, disposed on the strain structure and configured to measure the deformation amount of the strain structure and transform the deformation amount into deformation amount information; at least one temperature-sensing element, disposed in the strut and configured to measure a real-time temperature of the strut and transform the temperature into strut temperature information; and a processing unit, electrically connected to the strain gage and the temperature-sensing element respectively to obtain the deformation amount information and the strut temperature information.

In an embodiment, the top surface of the housing is flush with a mold cavity surface, and an end surface of the front end of the strut remains flat with the top surface when the strut is not under pressure during an initial installation.

In an embodiment, the strut further includes a strut body connected to the front end and a back end platform connected to the strut body and back to the front end, the back end platform is located in the accommodating space and abutted against the strain structure, a diameter of the back end platform is greater than a diameter of the channel, and an elastic part is sleeved on the strut body, so that two ends of the elastic part are respectively connected to an end surface of the channel through the back end platform and the accommodating space to limit a moving range of the elastic part, and the elastic part is configured to revert the strut to an original position when the strut relieves an external force and performs the axial displacement.

In an embodiment, the temperature-sensing elements are disposed on the strut and the strain structure, and are respectively configured to measure the strut temperature information and a real-time temperature of the strain structure, and return the strut temperature information and the real-time temperature to the processing unit.

In an embodiment, the strain structure includes a platen section, a base plate section and a pair of support beams respectively connected to the platen section and the base plate section at two ends, the base plate section is located on the mesa, the platen section is adjacent to an back end of the strut, the pair of support beams is disposed parallel to a moving direction of the strut, and a beam body of the pair of support beams, after taking the pressure exerted by the platen section, respectively bends and deforms in a direction back to another support beam, and the at least one strain gage is disposed in a beam body of one of the pair of support beams.

In an embodiment, the support beams may be made of materials such as metal and ceramic, or even may be made of plastic in a low temperature occasion. In principle, the support beams may be made of any material with a deformation amount in the accommodating space not causing a permanent deformation.

In an embodiment, that the base plate section is located on the mesa is: a hollow locating slot is formed in a central position of the base plate section, and a bump matching the locating slot is disposed on the corresponding mesa.

In an embodiment, a blind hole is disposed in an end surface center of the back end of the strut, and through holes are disposed in a center of the strain structure and a center of the base, so that transmission lines of power and signals of the strain gages and the temperature-sensing elements may penetrate outside the housing and the base.

In an embodiment, the processing unit respectively obtains the deformation amount information of the strain structure and the strut temperature information, and further estimates an actual mold cavity pressure value after estimating an effect on the deformation amount of a material of the strain structure in the strut temperature.

In an embodiment, the processing unit respectively obtains the deformation amount information of the strain structure, a real-time temperature of the strain structure and the strut temperature information at a same time, and further estimates an actual mold cavity pressure value after converting an effect of the real-time temperature of the strain structure on the deformation amount of a material of the strain structure.

Features of the present invention are: the present invention may provide a change process curve of process pressure and temperature of the mold cavity in a process stage, to achieve a purpose of determining finished product quality and verifying equipment functions, and injection molding process parameters may be measured to develop a quality detection system, thereby providing great help for the determining of the finished injection product quality. Previously, limited by sensing structure designs, many different sensors are used in different locations to perform a mold state monitoring, so that an installation and a configuration of a system are complicated, and sensing cannot be performed from a same location. A sensor established by the present invention may be used to measure a temperature and pressure change of the mold in real time. By using the sensor provided by the present invention to measure the pressure and temperature in the mold, the verification of the current injection molding equipment functions and determining of on-line finished product quality may be integrated. The sensing device of pressure and temperature in a mold provided by the present invention may measure the pressure and temperature of the mold in real time, to resolve system complication and low mold integration of an existing mold sensing technology.

DETAILED DESCRIPTION

Figure 1:
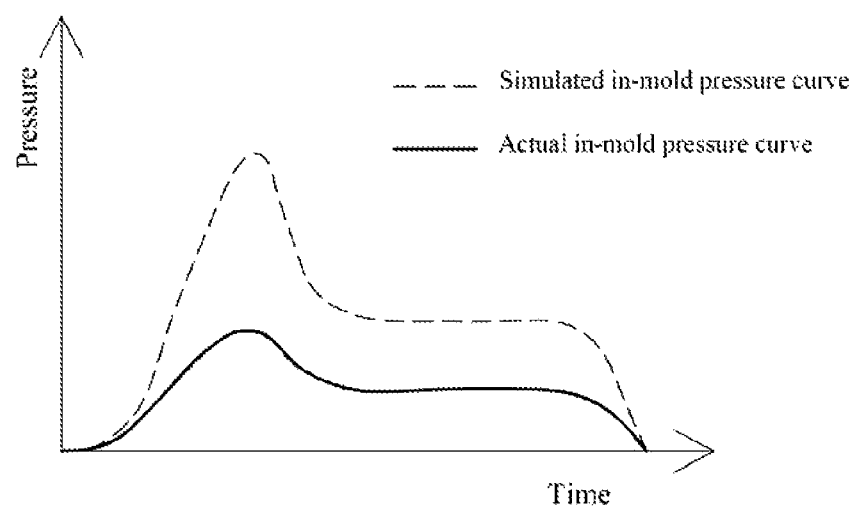
FIG. 1 is a change curve diagram of a simulated in-mold pressure and an actual in-mold pressure in a mold injection molding process in the related art.
Figure 2:
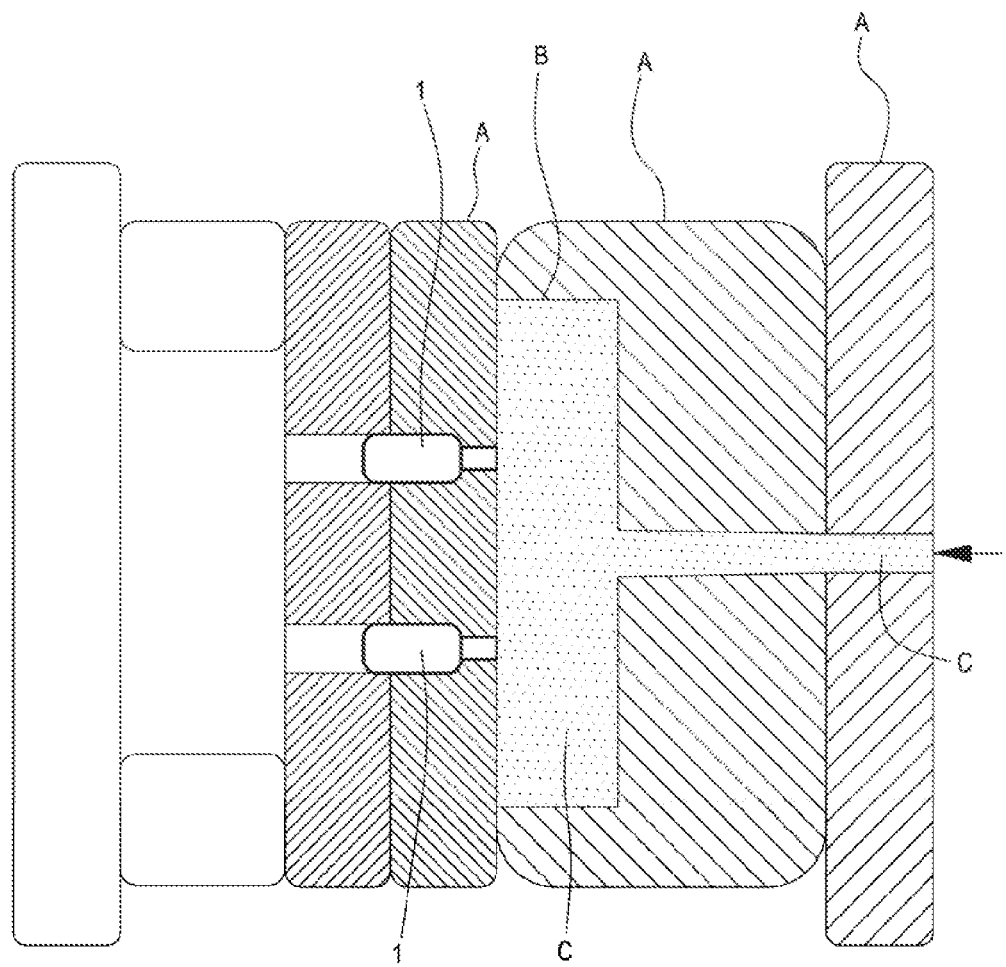
FIG. 2 is a sectional diagram according to an embodiment of a sensing device of pressure and temperature in a mold of the present invention applied to the mold.

The embodiments of the present invention are described in detail below with reference to the accompanying drawings. The accompanying drawings are mainly simplified schematic diagrams and a basic structure of the present invention is merely schematically described. Therefore, merely elements related to the present invention are marked in the drawings, and the shown elements are not drawn in numbers, shapes, scales and the like during implementation. Dimensions of the elements during actual implementation are actually an optional design, and layouts and forms of the elements may be more complicated.

Figure 3:
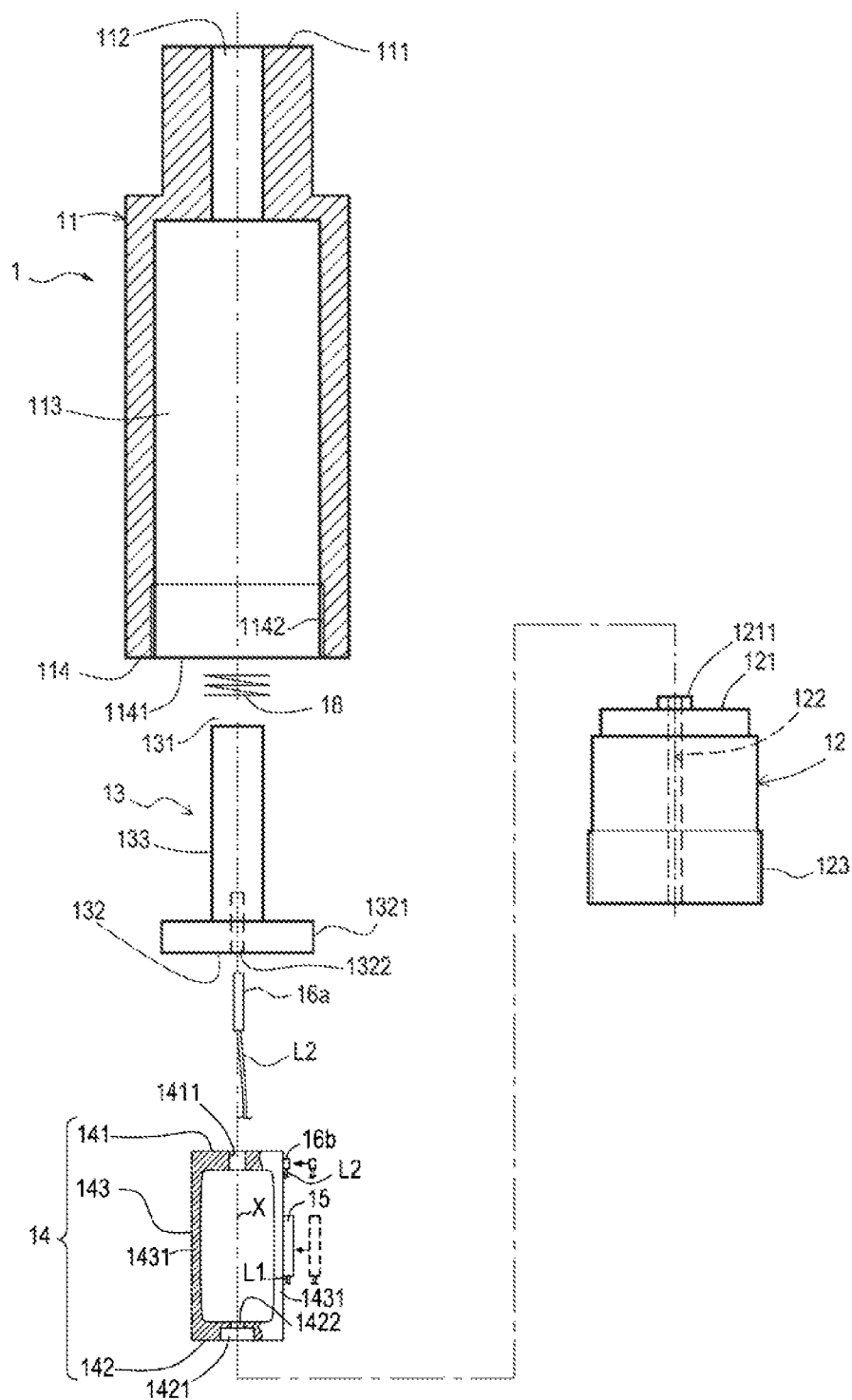
FIG. 3 is a front exploded view according to an embodiment of a sensing device of pressure and temperature in a mold of the present invention.
Figure 4:
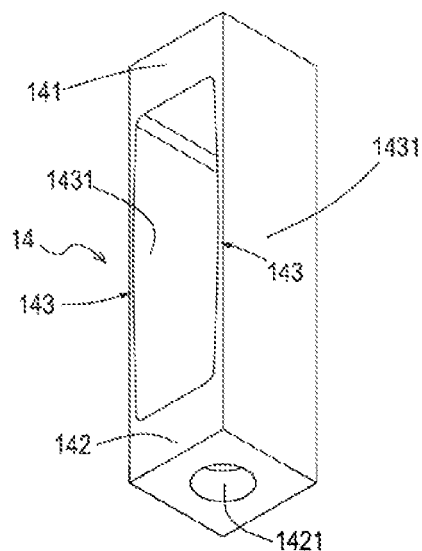
FIG. 4 is a stereo diagram of a strain structure according to an embodiment of a sensing device of pressure and temperature in a mold of the present invention.
Figure 5:
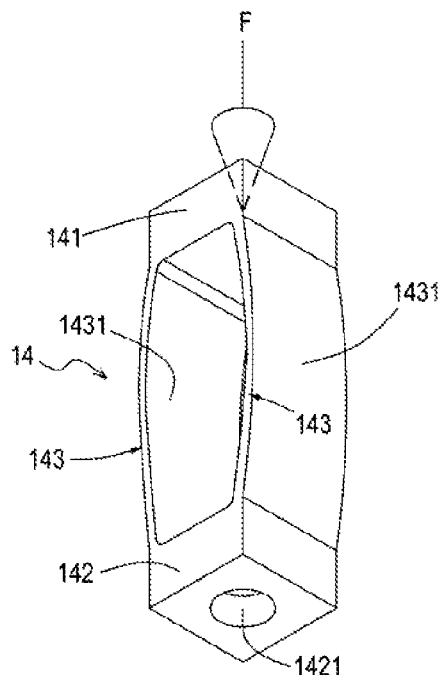
FIG. 5 is a stereo diagram of the strain structure of FIG. 3 deforming under pressure.
Figure 6:
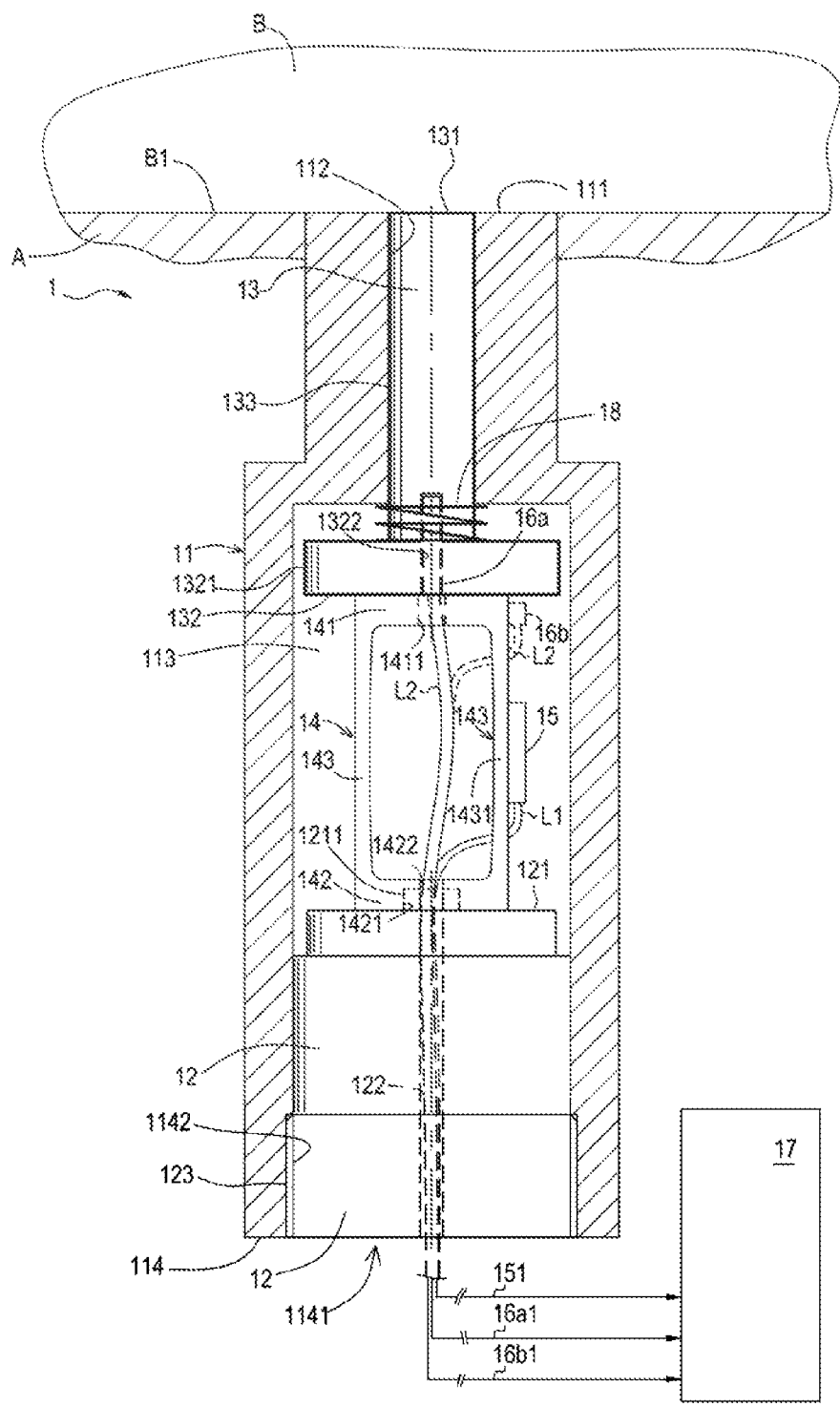
FIG. 6 a front constitutional diagram according to an embodiment of a sensing device of pressure and temperature in a mold of the present invention and a schematic state diagram of the sensing device when liquid is not injected into a mold cavity.
Figure 7:
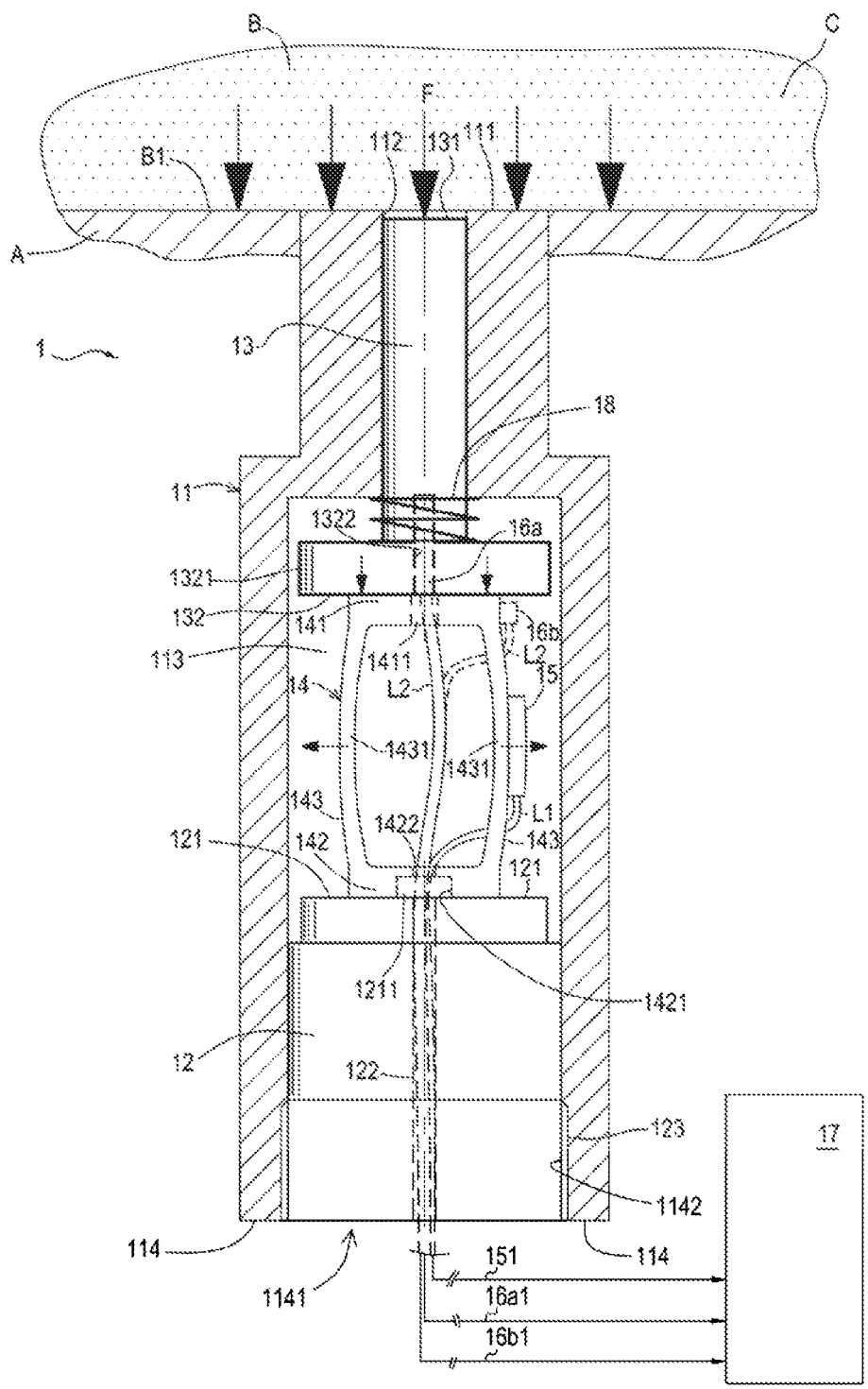
FIG. 7 a schematic movement diagram of a sensing device when liquid is injected into a mold cavity according to an embodiment of a sensing device of pressure and temperature in a mold of the present invention.

Referring to FIG. 2 to FIG. 7, a sensing device 1 of pressure and temperature of this embodiment is applied to a mold A, and the sensing device 1 of pressure and temperature includes: a housing 11, a base 12, a strut 13, a strain structure 14, a strain gage 15 and a temperature-sensing element 16. The housing 11 is disposed in the mold A and exposes a top surface 111 of the housing 11 to a mold cavity B of the mold A, the housing 11 includes a channel 112 hollowly disposed in the top surface 111 and an accommodating space 113 also disposed in the housing 11 and in communication with the channel 112, and a bottom surface 114 of the housing 11 includes an open end 1141 in communication with the accommodating space 113. The base 12 is disposed in the open end 1141 of the bottom surface 114 of the housing 11. Specifically, as the embodiments shown in FIG. 3, FIG. 6 and FIG. 7, a section of male threads 123 may be disposed on a peripheral wall of the base 12, and a section of female threads 1142 may be correspondingly disposed on an inner wall of the open end 1141 of the housing 11. The male threads 123 and the female threads 1142 are screwed to each other, so that the base 12 is separately disposed on the bottom surface 114 of the housing 11 (certainly, if there is no need to disassemble the base 12, manners such as welding and bonding may be used to combine the base 12 with the open end 1141 of the bottom surface 114 of the housing 11), to close the accommodating space 113. A mesa 121 is disposed on a top of the base 12, and a through hole 122 is disposed in a center of the base 12 through a central shaft of the base 12. The strut 13 is disposed in the accommodating space, and a front end 131 of the strut 13 is extended into the channel 112 and exposed to a space of the mold cavity B. As shown in FIG. 7, when the mold cavity B generates pressure F, the front end 131 of the strut 13 transfers the pressure of the mold cavity B, so that the strut 13 performs an axial displacement in the channel 112 to a direction of the accommodating space 113. The strain structure 14 is disposed between the mesa 121 and a back end 132 of the strut 13 and located on the mesa 121, and is configured to transform the pressure transferred by the displacement of the strut 13 into a deformation amount of the strain structure 14. The strain gage 15 is disposed on the strain structure and configured to transform the deformation amount of the strain structure 14 into deformation amount information 151. Certainly, if there is a plurality of deformation members (for example, support beams 143 shown in FIG. 6) of the strain structure 14, the strain gage 15 may be disposed on the deformation members one by one, or on a chosen one. The temperature-sensing element 16 (that is, a strut temperature-sensing element 16a) is disposed in the strut 13 (for example, as shown in FIG. 3 and FIG. 6, a blind hole 1322 may be hollowly disposed in an end surface center of the back end 132 of the strut 13) and configured to measure a real-time temperature of the strut 13 and transform the temperature into strut temperature information 16a1 (because the front end 131 of the strut 13 is exposed to the mold cavity B, the strut temperature information 16a1 may obtain a more accurate actual temperature value of the mold cavity B). The processing unit 17 is electrically connected to the strain gage 15 and the temperature-sensing element 16 respectively to obtain the deformation amount information 151 and the strut temperature information 16a1 as a basis for transforming the deformation amount information 151 into pressure information.

In an embodiment, as shown in FIG. 6, the top surface 111 of the housing 11 is flush with a mold cavity surface B1, and an end surface of the front end 131 of the strut 13 remains flat with the top surface 111 when the strut 13 is not under the pressure F of the mold cavity B in an initial installation state. As shown in FIG. 7, when an injection molding process and the like is performed, the mold cavity B performs a pressure increase change because of injection molding of liquid C, the pressure F of the mold cavity B pushes the strut 13 to a top (a platen section 141) of the strain structure 14. Because the strain structure 14 is located on the fixed mesa 121 of the based 12 by a bottom (a base plate section 142), the base plate section 142 of the strain structure 14 is fixed, so that pressure from the platen section 141 causes the support beam 143 to deform, and the strain gage 15 disposed on the support beam 143 may measure a deformation value.

In an embodiment, as shown in FIG. 3, the strut further comprises a strut body 133 connected to the front end 131 and a back end platform 1321 connected to the strut body 133 and located in the back end 132, the back end platform 1321 is located in the accommodating space 113 and abutted against the strain structure 14, a diameter of the back end platform 1321 is greater than a diameter of the channel 112, and an elastic part 18 (for example, a compression spring or a taper washer) is sleeved on the strut body 133, so that moving ranges of two ends of the elastic part 18 are respectively limited by a top surface of the back end platform 1321 and an end surface of the channel 112 in communication with the accommodating space 113, and the elastic part 18 is configured to, after the strut 13 relieving an external force (the mold cavity pressure), and when the strain structure 14 reverts and pushes the strut 13 back, make the platen section 141 of the strain structure 14 abutted against the back end 132 (that is, a bottom surface of the back end platform 1321) of the strut 13.

In an embodiment, the temperature-sensing element 16 may be the strut temperature-sensing element 16a and a strain structure temperature-sensing element 16b, where the strut temperature-sensing element 16a is disposed on the strut 13, the strain structure temperature-sensing element 16b is disposed on the strain structure 14, and the strut temperature-sensing element 16a and the strain structure temperature-sensing element 16b may respectively measure the strut temperature information 16a1 and strain structure temperature information 16a2 of the strain structure 14, and return the strut temperature information 16a1 and the strain structure temperature information 16a2 to the processing unit 17.

In an embodiment, as shown in FIG. 6 and FIG. 7, the strain structure 14 includes the platen section 141, the base plate section 142 and a pair of elastic support beams 143 respectively connected to the platen section and the base plate section at two ends, the base plate section 142 is located on the mesa 121 (specifically, a locating manner of the base plate section 142 is to form a hollow locating slot 1421 in a central position of the base plate section 142, and dispose a bump 1211 matching the locating slot 1421 on the corresponding mesa 121), the platen section 141 is adjacent to the back end 132 of the strut 13, the pair of support beams 143 is disposed parallel to an axial moving direction of the strut 13 (as shown in FIG. 3), and a beam body 1431 of the pair of support beams 143, after taking the pressure F exerted by the platen section 141, respectively bends and deforms in a direction back to or facing another support beam 143 (that is, bending outwards or inwards the strain structure 14, for example, FIG. 4 and FIG. 5 shows implementation forms of the pair of support beams 143 bending outwards the strain structure 14), and the strain gage 15 may be disposed in one of the pair of support beams 143 or the beam body 1431 of the two support beams 143. As shown in FIG. 3, thicknesses of the two support beams 143 may be the same, or may be different, and the two support beams 143 may be disposed in a same diameter or in different diameters compared to a central shaft X of the strain structure 14 and is based on a location or a quantity of the strain gage 15 disposed in one of or both the two support beams 143.

Certainly, the support beams 143 are preferably made of metal materials, but are not limited hereto, for example, may be made of materials such as ceramic, or even may be made of plastic in a low temperature occasion, and the support beams 131 may be made of any material so long as the support beams 143 may resist a temperature of a mold process in the accommodating space 113, and a deformation amount of the support beams 143 does not cause a permanent deformation.

It should be noted, a through hole 1411 is disposed in a center of the platen section 141 of the strain structure 14, a through hole 1422 is disposed in a center of the base plate section 142 and a through hole 122 is disposed in a center of the base, so that transmission lines (L1, L2) of power and signals of the strain gages 15 and the temperature-sensing elements 16 may penetrate outside the housing 11 and the base 12, as shown in FIG. 6 and FIG. 7. Certainly, after the transmission lines (L1, L2) are pulled out through the through hole 122, sealing may be performed as needed.

Further, the processing unit 17 respectively obtains the deformation amount information 151 of the strain structure 14 by the strain gage 15 and the strut temperature information 16a1 by the strut temperature-sensing element 16a, and further estimates an actual mold cavity pressure value after estimating an effect of the strut temperature information 16a1 on the deformation amount of the material of the strain structure 14 (the deformation amount of a same material may vary under different temperatures). Further, in addition to disposing the strut temperature-sensing element 16a in the strut 13, when the strain structure temperature-sensing element 16b is also disposed in the strain structure 14, the processing unit 17 may respectively obtain the deformation amount information 151 of the strain structure 14, real-time temperature strain structure temperature information 16b1 of the strain structure 14 and the strut temperature information 16a1 at a same time, and further estimates the actual mold cavity pressure value after converting an effect of the real-time temperature of the strain structure 14 on the deformation amount of the strain structure 14. In this embodiment, because the real-time temperature of the strain structure 14 may be obtained directly, a more accurate deformation amount effect may be obtained, and the actual mold cavity pressure value may be more correctly estimated, so as to provide a change process curve of process pressure and temperature of the mold cavity in a process stage, to achieve a purpose of determining finished product quality and verifying equipment functions.

The foregoing embodiments are merely exemplary descriptions of principles, characteristics and effects of the present invention, and are not intended to limit the scope of the present invention. Any person skilled in the art can make some modifications or variations to the foregoing embodiments without departing from the spirit and the scope of the present invention. Any equivalent change or modification made based on the disclosed content of the present invention shall fall within the scope of the following claims. Therefore, the scope of protection of present invention shall be subject to the following claims.

What is claimed is:

1. A sensing device of pressure and temperature in a mold, a structure of the sensing device comprising:
    a housing, disposed in the mold and exposing a top surface to a mold cavity of the mold, wherein the top surface comprises a hollowly disposed channel and is in communication with an accommodating space in the housing, and a bottom surface of the housing comprises an open end in communication with the accommodating space;
    a base, disposed on the bottom surface of the housing to close the accommodating space, and comprising a mesa on a top, wherein a through hole is disposed in a center of the base;
    a strut, disposed in the accommodating space, wherein a front end of the strut is extended into the channel and exposed to the mold cavity, so that after the front end transfers pressure of the mold cavity, the strut performs an axial displacement in the channel;
    a strain structure, disposed between the mesa and the strut and configured to transform the pressure transferred by the displacement of the strut into a deformation amount of the strain structure;
    at least one strain gage, disposed on the strain structure and configured to measure the deformation amount of the strain structure and transform the deformation amount into deformation amount information;
    at least one temperature-sensing element, disposed in the strut and configured to measure a real-time temperature of the strut and transform the temperature into strut temperature information; and
    a processing unit, electrically connected to the strain gage and the temperature-sensing element respectively to obtain the deformation amount information and the strut temperature information.

2. The sensing device of pressure and temperature in a mold according to claim 1, wherein the top surface of the housing is flush with a mold cavity surface, and an end surface of the front end of the strut remains flat with the top surface when the strut is not under pressure during an initial installation.

3. The sensing device of pressure and temperature in a mold according to claim 2, wherein the strut further comprises a strut body connected to the front end and a back end platform connected to the strut body and back to the front end, the back end platform is located in the accommodating space and abutted against the strain structure, a diameter of the back end platform is greater than a diameter of the channel, and an elastic part is sleeved on the strut body, so that two ends of the elastic part are respectively connected to an end surface of the channel through the back end platform and the accommodating space, to jointly limit a moving range of the elastic part.

4. The sensing device of pressure and temperature in a mold according to claim 3, wherein the strain structure comprises a platen section, a base plate section and a pair of elastic support beams respectively connected to the platen section and the base plate section at two ends, the base plate section is located on the mesa, the platen section is adjacent to an back end of the strut, the pair of support beams is disposed parallel to a moving direction of the strut, and a beam body of the pair of support beams, after taking the pressure exerted by the platen section, respectively bends and deforms in a direction back to or facing another support beam, and the at least one strain gage is disposed in a beam body of one of the pair of support beams.

5. The sensing device of pressure and temperature in a mold according to claim 4, wherein the support beams are made of materials such as metal, ceramic or plastic, the support beams may resist a temperature of a mold process in the accommodating space, and a deformation amount of the support beams does not cause a permanent deformation.

6. The sensing device of pressure and temperature in a mold according to claim 4, wherein that the base plate section is located on the mesa is: a hollow locating slot is formed in a central position of the base plate section, and a bump matching the locating slot is disposed on the corresponding mesa.

7. The sensing device of pressure and temperature in a mold according to claim 2, wherein the strain structure comprises a platen section, a base plate section and a pair of elastic support beams respectively connected to the platen section and the base plate section at two ends, the base plate section is located on the mesa, the platen section is adjacent to an back end of the strut, the pair of support beams is disposed parallel to a moving direction of the strut, and a beam body of the pair of support beams, after taking the pressure exerted by the platen section, respectively bends and deforms in a direction back to or facing another support beam, and the at least one strain gage is disposed in a beam body of one of the pair of support beams.

8. The sensing device of pressure and temperature in a mold according to claim 7, wherein the support beams are made of materials such as metal, ceramic or plastic, the support beams may resist a temperature of a mold process in the accommodating space, and a deformation amount of the support beams does not cause a permanent deformation.

9. The sensing device of pressure and temperature in a mold according to claim 7, wherein that the base plate section is located on the mesa is: a hollow locating slot is formed in a central position of the base plate section, and a bump matching the locating slot is disposed on the corresponding mesa.

10. The sensing device of pressure and temperature in a mold according to claim 1, wherein the temperature-sensing elements are disposed on the strut and the strain structure, and are respectively configured to measure the strut temperature information and strain structure temperature information of the strain structure, and return the strut temperature information and the strain structure temperature information to the processing unit.

11. The sensing device of pressure and temperature in a mold according to claim 10, wherein the strain structure comprises a platen section, a base plate section and a pair of elastic support beams respectively connected to the platen section and the base plate section at two ends, the base plate section is located on the mesa, the platen section is adjacent to an back end of the strut, the pair of support beams is disposed parallel to a moving direction of the strut, and a beam body of the pair of support beams, after taking the pressure exerted by the platen section, respectively bends and deforms in a direction back to or facing another support beam, and the at least one strain gage is disposed in a beam body of one of the pair of support beams.

12. The sensing device of pressure and temperature in a mold according to claim 11, wherein the support beams are made of materials such as metal, ceramic or plastic, the support beams may resist a temperature of a mold process in the accommodating space, and a deformation amount of the support beams does not cause a permanent deformation.

13. The sensing device of pressure and temperature in a mold according to claim 11, wherein that the base plate section is located on the mesa is: a hollow locating slot is formed in a central position of the base plate section, and a bump matching the locating slot is disposed on the corresponding mesa.

14. The sensing device of pressure and temperature in a mold according to claim 10, wherein through holes are disposed in a center of the platen section of the strain structure, a center of the base plate section and a center of the base, so that transmission lines of power and signals of the strain gages and the temperature-sensing elements penetrate outside the housing and the base.

15. The sensing device of pressure and temperature in a mold according to claim 10, wherein the processing unit respectively obtains deformation amount information of the strain structure, a real-time temperature of the strain structure and the strut temperature information at a same time, and further estimates an actual mold cavity pressure value after converting an effect of the real-time temperature of the strain structure on the deformation amount of a material of the strain structure.

16. The sensing device of pressure and temperature in a mold according to claim 1, wherein the strain structure comprises a platen section, a base plate section and a pair of elastic support beams respectively connected to the platen section and the base plate section at two ends, the base plate section is located on the mesa, the platen section is adjacent to an back end of the strut, the pair of support beams is disposed parallel to a moving direction of the strut, and a beam body of the pair of support beams, after taking the pressure exerted by the platen section, respectively bends and deforms in a direction back to or facing another support beam, and the at least one strain gage is disposed in a beam body of one of the pair of support beams.

17. The sensing device of pressure and temperature in a mold according to claim 16, wherein the support beams are made of materials such as metal, ceramic or plastic, the support beams may resist a temperature of a mold process in the accommodating space, and a deformation amount of the support beams does not cause a permanent deformation.

18. The sensing device of pressure and temperature in a mold according to claim 16, wherein that the base plate section is located on the mesa is: a hollow locating slot is formed in a central position of the base plate section, and a bump matching the locating slot is disposed on the corresponding mesa.

19. The sensing device of pressure and temperature in a mold according to claim 1, wherein the processing unit respectively obtains the deformation amount information and the strut temperature information, and further estimates an actual mold cavity pressure value after estimating an effect of the strut temperature information on the deformation amount of a material of the strain structure.

* * * * *